Aug. 11, 1953     R. A. SHIELDS     2,648,448
VEHICLE UNLOADER CAR
Filed April 1, 1949     3 Sheets-Sheet 1
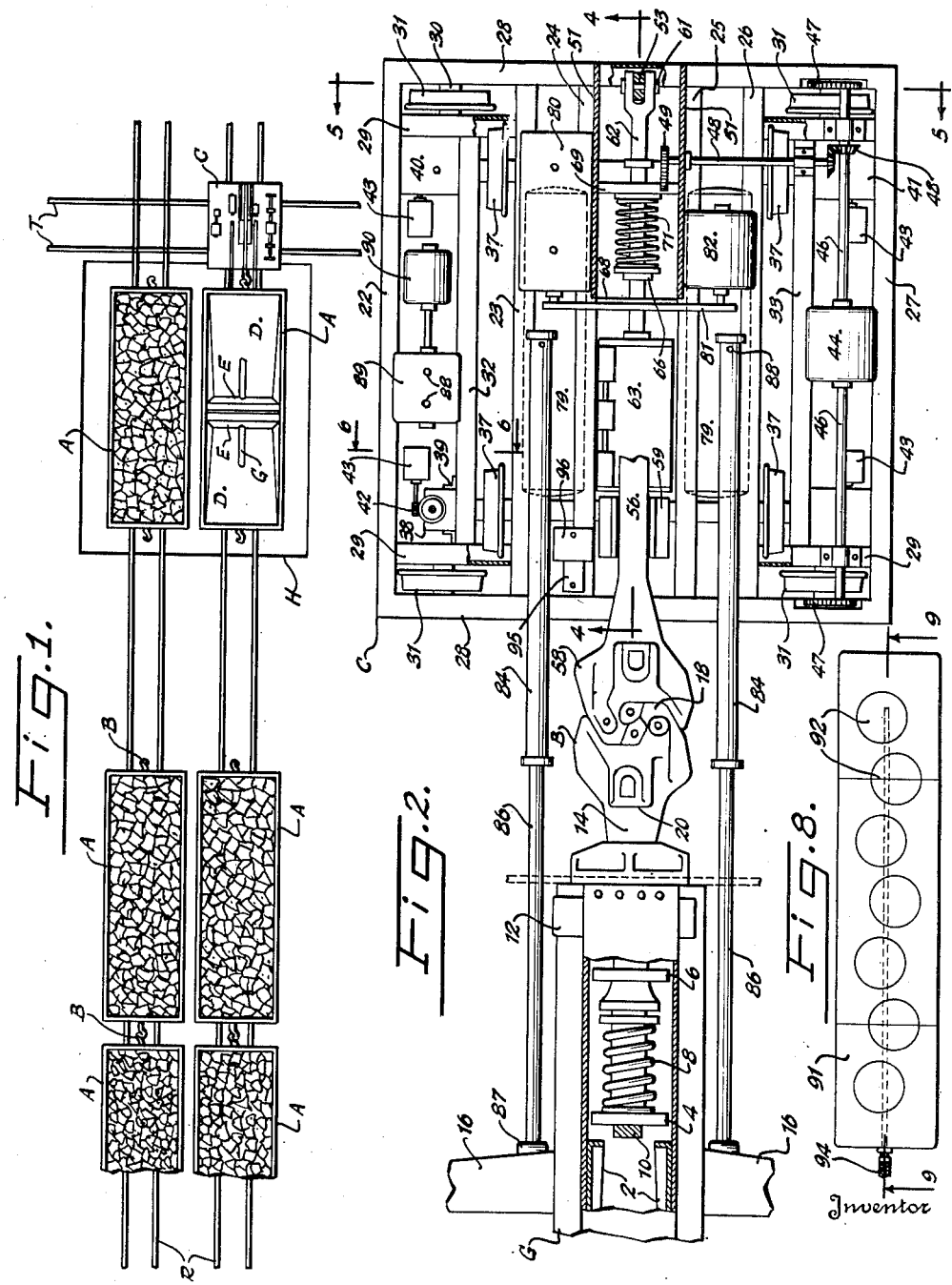

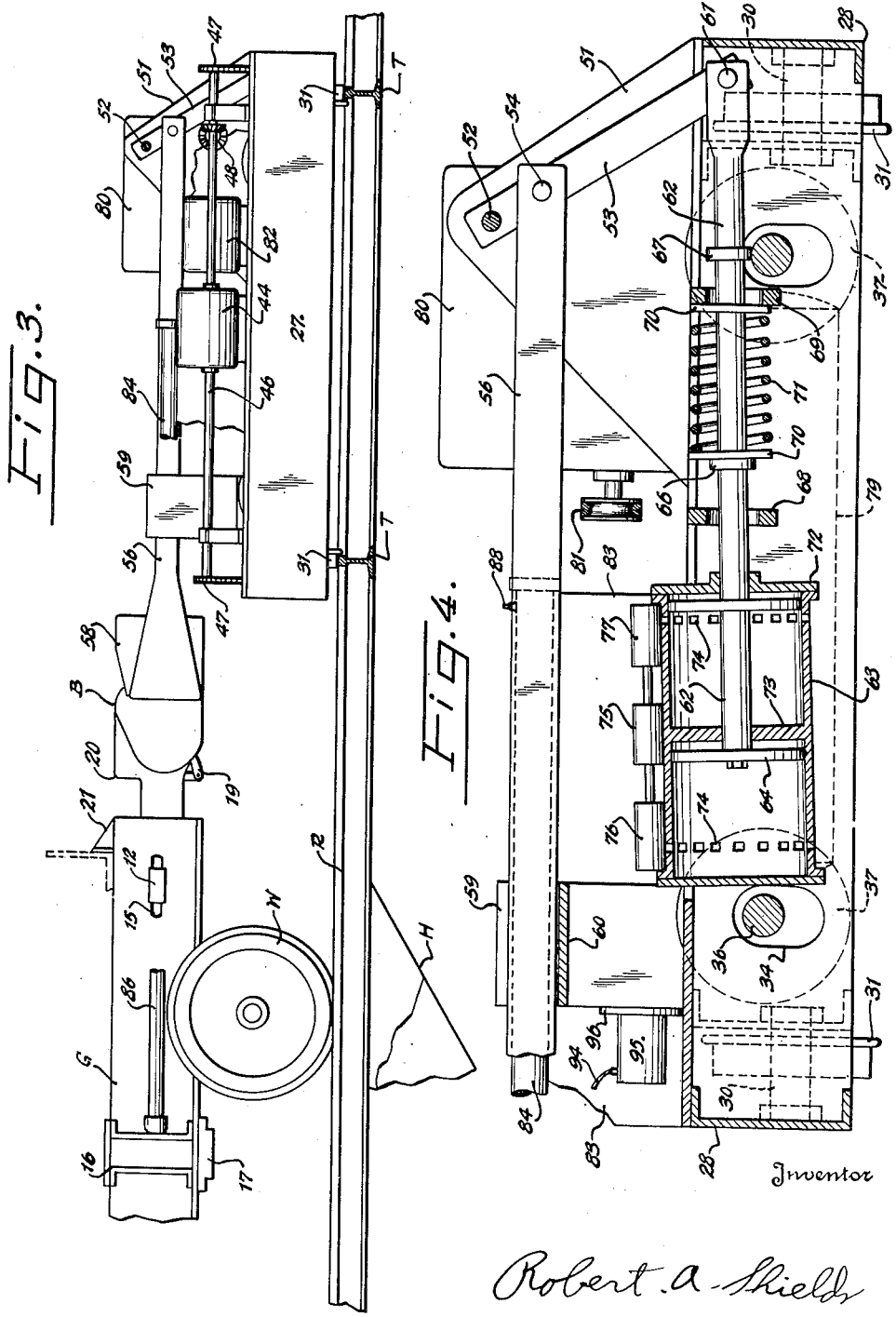

Aug. 11, 1953 R. A. SHIELDS 2,648,448
VEHICLE UNLOADER CAR
Filed April 1, 1949 3 Sheets-Sheet 3
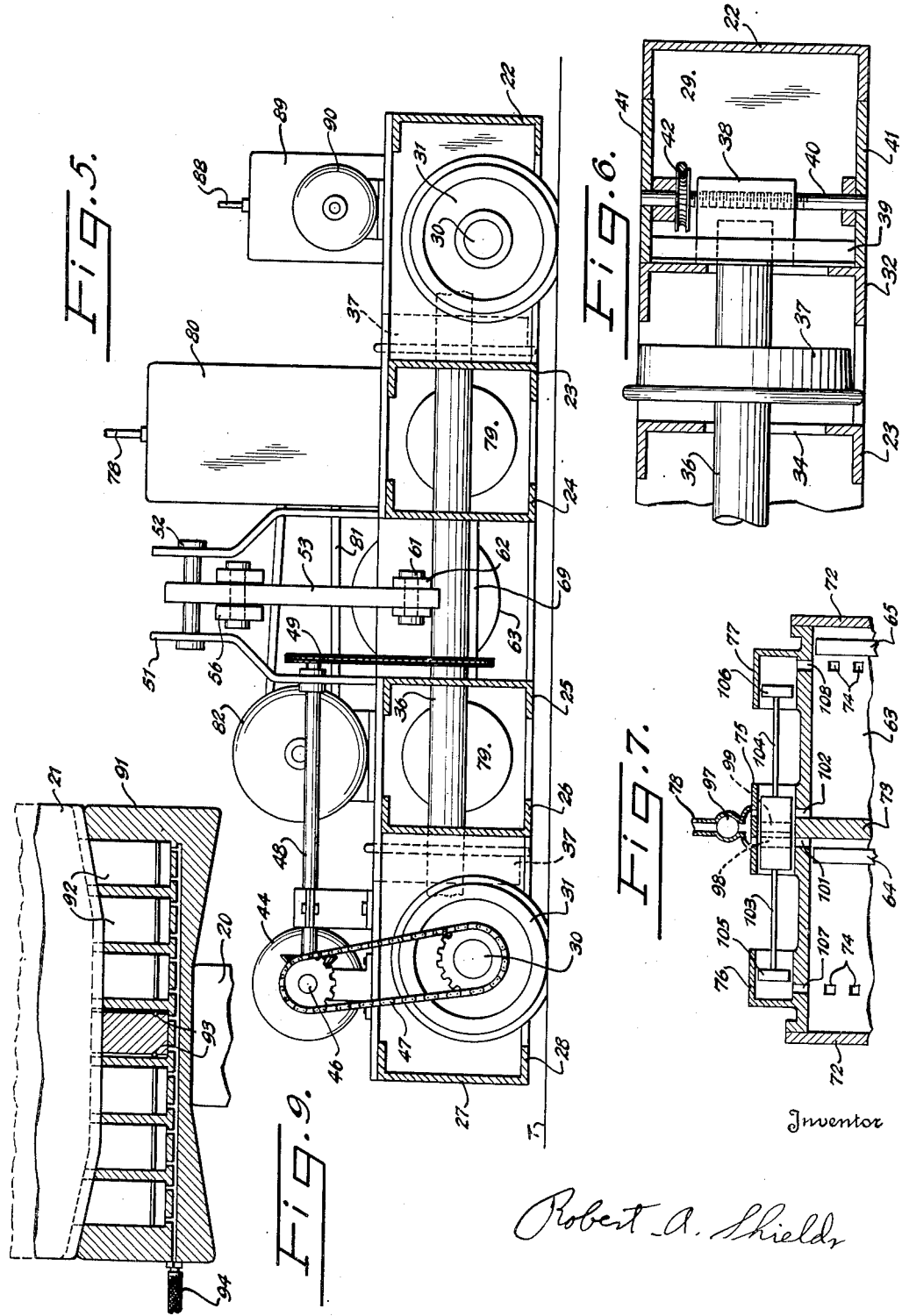
Inventor
Robert A. Shields Patented Aug. 11, 1953

2,648,448

UNITED STATES PATENT OFFICE 2,648,448

VEHICLE UNLOADER CAR

Robert A. Shields, Bloomsburg, Pa., assignor to American Car and Foundry Company, New York, N. Y., a corporation of New Jersey Application April 1, 1949, Serial No. 84,935

6 Claims. (Cl. 214—64.2)

This invention relates to vehicle unloaders in general and in particular to unloaders which can be used with railway hopper cars of the bottom discharge type and which can be shifted to unload cars on adjacent tracks.

Bottom discharge vehicles have been unloaded in various ways, for example, by use of sledge hammers, car carried vibrators and by external mechanical devices carried on overhead structures and acting on the car or lading. Among such devices are the overhead vibrators, augers, wedges and spears. Every one of these devices are harmful to the car structure and expensive to operate and maintain. Also, the first installation cost is extremely high due to the necessity of a large and expensive superstructure at each dumping station. None of the devices heretofore used for unloading cars apply the impact to the car structure or lading in the direction of greatest strength for the car. It is an object, therefore, of the present invention to provide a vehicle unloader which applies the impact to the car in the direction of greatest strength and to the greatest strength members.

A further object of the invention is the provision of a vehicle unloader which can service several tracks and which eliminates the use of any permanent superstructure at the dumping station.

A still further object of the invention is the provision of a vehicle unloader which can unload the cars on several tracks and which can also be used to shift the cars when necessary.

A yet further object of the invention is the provision of a vehicle unloader which imparts a shaking or jarring action to the car in such a manner as to substantially pump the material out of the discharge openings.

Still another object of the invention is the provision of a vehicle unloader which can be connected to the standard car coupler and which can apply a variable motion to the car in either direction.

These and other objects of the invention will be apparent to persons skilled in the art from a study of the following description and accompanying drawings, in which Fig. 1 is a schematic plan view of an installation for unloading of railway hopper cars;

Fig. 2 is an enlarged view of the improved shaker car shown as coupled to a railway car and with parts removed or broken away to better disclose the construction;

Fig. 3 is an elevational view of the parts shown in Fig. 2;

Fig. 4 is an enlarged sectional view taken substantially on line 4—4 of Fig. 2;

Fig. 5 is an end sectional view taken substantially on line 5—5 of Fig. 2;

Fig. 6 is a sectional view taken substantially on line 6—6 of Fig. 2 and showing primarily one form of the raising and lowering mechanism;

Fig. 7 is a fragmental sectional view taken through the cylinder and valve operator shown in Figs. 2 and 4;

Fig. 8 is an elevational view of a wedge or lockout device which can be used with the unloader, and Fig. 9 is a sectional view taken substantially on line 9—9 of Fig. 8.

Referring now to the drawings in detail it will be seen that the vehicles illustrated are railway hopper cars A supported on rails R and adapted to be coupled together by standard couplers B. As shown the cars are loaded with coal or other lading excepting the one car which is coupled to the unloader car C. This unloaded railway car is shown as of the twin hopper type having slope sheets D sloping downwardly toward the central portion of the car where discharge openings E are provided on either side of the center sill structure G. The rails R extend continuously across a hopper or bin H, along one end of which extend transverse rails T upon which the unloader car C will be normally supported. These tracks T and rails R are provided with the customary and well known cross members so that movement of the unloader car C in a transverse direction and the movement of hopper cars A in a longitudinal direction will be unimpeded.

Railway hopper cars and similar railway vehicles will vary in the number of hoppers and discharge openings, but irrespective of the number they are all provided with downwardly sloping sheets along which the lading is intended to slide or discharge out of the openings when the car doors are opened. Also, irrespective of the number and arrangement of the hoppers, the center sill structure G has to be extremely strong since it must serve as a beam of sufficient strength to transmit the entire draft and buff forces incident to being coupled in a long train. As shown in Figs. 2 and 3 the center sill structure G has included therein in any well known manner the back stops 2 ahead of which is mounted the draft gear, including back followers 4, front follower 6 and spring or other shock absorbing device 8. In the form shown a yoke 10 is connected by a draft key 12 to the shank 14 of the car coupler B. The draft key 12 rides in a slot 15 formed in the center sill structure, thus permitting the coupler shank to move forwardly or rearwardly under draft and buff forces and to transmit the same to the shock absorbing device or spring 8. Normally, the rear follower 4 will be in contact with the back stops 2 but when the coupler shank has been pulled forwardly the follower will move away from the back stops as shown in Fig. 2 and also the draft key 12 will move forwardly in the sill slot 15. Customary bolsters 16 are shown as attached to the center sill structure and these bolsters will aid in transmitting the lading load from the car body to the center sill structure and thence into the center bearing structure 17 (Fig. 3), which is supported in the well known manner on the truck bolster, which in turn is supported by the truck frames and wheels and axle assemblies W (one only of which is shown).

Car couplers for railway cars are well standardized as to shape and contour and each is provided with a knuckle 18 controlled by a locking and unlocking device 19 which can be controlled from the side of the car. Also, each coupler is provided with a horn or vertical ledge portion 20 adapted under excessive buff conditions to contact the striker 21 rigidly attached to the car center sill structure at the end thereof. The couplers are designed to transmit the entire tractive effort of the locomotive and accordingly are made extremely strong and are so connected through the draft gearing to the center sill structure as to transmit this tractive effort. Accordingly, it will be seen that the couplers, draft gear and center sill structure are far stronger than is necessary to merely carry the car body and lading. Railway cars are coupled by bumping the couplers together with considerable impact and consequently the body must be very strongly attached to the center sill structure to withstand this normal longitudinal impact incident to coupling. The unloader car C is adapted to be connected to the car and shake the same in the longitudinal direction, that is, in the same direction as the haulage, braking and coupling strains to which the car is normally subjected.

The unloader car C is preferably formed with full length longitudinal members 22, 23, 24, 25, 26 and 27 joined at their ends by transversely extending members 28. As shown these members are all of channel formation but they may be of any similar structural or welded configuration. Short channel members 29 join longitudinals 22 and 23 and 26 and 27. Attached to channels 29 and 28 are boxes for the reception of stub axles 30 which are supported on flanged wheels 31 located adjacent each corner of the unloader car and adapted to rest on and run along rails T. Intermediate the ends of channels 29 channels 32 and 33 extend parallel to channels 22 and 27 respectively. Channels 23, 24, 25, 26, 32 and 33 are vertically slotted as at 34 and through which slots axles 36 extend and which axles carry thereon wheels 37. These wheels 37 are spaced on axles 36 the proper distance so as to run on rails R and are located at right angles to the wheels 31 previously referred to. The axles 36 extend beyond channels 32 and 33 and have mounted thereon boxes 38 adapted to ride between angle guides 39 fastened to channels 32 and 33. Each box 38 is provided with threads adapted to engage corresponding threads of a lead screw 40 journaled at its top and bottom edges in plates 41, welded or otherwise secured to channels 22 and 32 and 27 and 33. Each lead screw is adapted to be driven by a worm and worm gear 42 by individual motors 43. These motors 43 may be electrically locked together so as to operate in unison, or they may be of the torque type operating separately to drive the lead screws thus lifting the car by forcing the box 38 downwardly and through axles 36 and wheels 37 engaging the rails R. It is obvious, of course, that this lifting operation will be done only when the unloader car is properly spotted with the wheels 37 above the rails R. In order to cause shifting of the unloader car along rails T a motor 44 is connected through shafting 46 and chain or belt drive 47 to stub axles 30, thus driving at least one pair of wheels 31. Bevel gearing and shafting 48 is adapted to be driven by shaft 46 and through a chain or belt drive 49 will drive at least one of the axles 36, thus causing movement of the car along rails R when the car is supported on such rails and with the wheels 31 out of contact with the rails T. Suitable clutching means may be provided for the belt or chain drives 47 and 49.

Preferably, the entire unloader car frame will be connected by a heavy floor plate (not shown) on which equipment such as the motor 44 as well as other equipment, later to be described, may be mounted. This floor plate will, of course, have certain portions cut out to permit frame carried members to project upwardly therethrough. For example, small cutouts will be necessary to allow the flanges of wheels 37 to extend through the plate when such wheels are in raised position. Extending upwardly from the floor plate are a pair of spaced triangular shaped plates 51, which plates are directed inwardly and upwardly to receive a pivot pin 52 extending through the plates and through the upper end of a lever arm 53. Closely adjacent the pivot pin 52 is a pivot pin 54 which extends through the inner end of a coupler shank 56 extending forwardly across the unloader car and carrying on its forward end a dummy coupler head 58 adapted to couple with the standard couplers B of the railway cars A. Plates 59 extend upwardly adjacent the forward edge of the unloader car and are joined together by a plate 60, thus forming a supporting slide and guide arrangement for the forward end of the dummy coupler shank. The lower end of the lever 53 extends downwardly below the floor level and is pin connected as at 61 to a piston rod 62. This piston rod extends into a cylinder 63 and has attached thereto spaced pistons 64 and 65. The cylinder as clearly shown is firmly attached to channels 24 and 25 and between the axles 36. The piston rod is provided with spaced stops 66 and 67 adapted to pass through holes in heavy plates 68 and 69, respectively, rigidly attached to the channels 24 and 25. Mounted on the piston rod between stops 66 and 67 are follower plates 70 against which bear the ends of a spring or other resilient device 71. The cylinder 63 is preferably formed with removable ends 72 and an integral intermediate wall 73. One of the heads and intermediate wall will, of course, be pierced to receive the piston rod 62 and provided with suitable packing such as an O-ring. Likewise, the pistons 64 and 65 will be provided with suitable piston or O-rings adapted to seal them with respect to the cylinder walls. Adjacent the heads of the cylinder a plurality of exhaust ports 74 are provided, which ports are uncovered at the extreme end stroke of the piston in either direction. Admission of fluid to the cylinder is controlled by a slide valve 75 operated by pistons carried in exhaust controlled cylinders 76 and 77.

Motive fluid, such as air, may be supplied to slide valve 75 through piping 78 connected in any suitable manner to fluid reservoirs 79 mounted beneath the floor and between channels 23 and 24 and 25 and 26. Motive fluid, such as air, is supplied to tanks or reservoirs from a compressor or fluid pump 80 driven through belting 81 by an electric motor or other prime mover 82. As clearly shown the compressor and motor are mounted on opposite sides of the triangular shaped plates 51 in order that the weights may be evenly distributed on the unloader car frame.

Welded or otherwise secured to the floor member on either side of the dummy coupler support are plates 83 on the upper edge of which are welded or otherwise secured cylinders 84 within which pistons 86 may reciprocate, these pistons being provided with a head portion 87 adapted to bear on the bolster 16 or some similar car part. Fluid, preferably a hydraulic fluid, will be supplied cylinders 84 through pipes 88 from a source of hydraulic pressure such as pump 89 preferably driven by motor or other prime mover 90. By admitting hydraulic fluid to cylinders 84 the pistons 86 may be pushed outwardly against the bolsters or retracted to a position adjacent the ends of the dummy coupler 58. It will thus be seen that by admitting high pressure fluid to the cylinders 84 the pistons will tend to push the hopper car away from the unloader car to which it is coupled, thus bringing the follower plate 4 to the position shown in Fig. 2, that is, with the springs 8 placed under a definite compression. With the springs 8 compressed the hopper car may be shaken longitudinally by the unloader car and with either the pushers 87 in contact with the bolster or retracted therefrom, in which case a wedge or block member 91 will be dropped into position between the horn 20 and the striker 21 prior to retraction of the pushers 87.

The wedge 91 may be solid and inserted between the horn 20 and striker 21 or, as shown in Figs. 8 and 9, the wedge may be equipped with a plurality of pistons 92 movable in bores of block 91, with leakage prevented by O-ring or similar members 93. Fluid pressure will be supplied to the bores beneath the pistons by means of a passageway and flexible tubing 94 connected to a booster cylinder 95 driven by a larger cylinder 96 connected to the piping 88 of the pump 89. In this manner high hydraulic pressure may be supplied beneath the pistons 92 and in a definite amount. With a definite measured amount of hydraulic fluid it will be impossible to accidentally blow out the pistons 92 from the block 91 since the amount of fluid will be predetermined so as to prevent supplying sufficient fluid to move the piston sealing rings 93 out of the block 91. It will be obvious that when pressure fluid is supplied from pump 89 to large cylinder 96 it will through the piston in small cylinder 95 increase the pressure and cause the pistons 92 to be urged against striker 21. In this manner the horn 20 and striker 21 will be separated and the draft springs 8 compressed in the same manner as was done by use of the cylinders 84. The block 91 as shown in Figs. 8 and 9 will, of course, be of a width equal to the normal gap between the horn and striker. However, in cases where the pushers 87 of cylinders 84 are used the solid block referred to will be of a thickness to fill the increased gap between the horn and striker caused by the compression of springs 8. In cases where either the pusher cylinders 84 or the wedge pistons 92 are used a resilient force will be constantly exerted tending to separate the horn and striker or, in other words, a resilient force counteracting the resilient force stored in the spring 8.

Reciprocation of the dummy coupler 58 and anything connected thereto will be accomplished by the cylinder 63 and the connected mechanisms. As clearly shown in Fig. 7 air or other motive fluid flowing through pipes 78 may flow through shutoff valve 97 to the slide valve chamber 75. Within this chamber is mounted a slide valve having ports 98 and 99 adapted to be brought into register with ports 101 and 102 giving access to cylinder 63 on either side of the central divider 73. From the slide valve rods 103 and 104 extend and are connected to pistons 105 and 106 slidable respectively in the control chambers 76 and 77. These control cylinders are mounted over and connected to several of the exhaust ports 74 by passages 107 and 108 respectively. As shown in Figs. 4 and 7 the piston rod 62 has moved its full stroke to the right and the piston 65 has moved past the ports 74 and exhausted the pressure in the cylinder. The exhausting of this pressure has caused the piston 106 to be moved to the left, pushing the slide valve to the full line position shown and disconnecting slide port 99 from passage 102 and connecting port 98 to passage 101. In this position of the slide valve fluid pressure from pipe 78 will be admitted to the space between piston 64 and dividing wall 73, thus forcing the piston 62 to the left under both the fluid pressure and the stored energy of spring 71. This combined action will deliver in effect a hammer blow to the lower end of lever 53 which, of course, will be multiplied and transmitted to the dummy coupled shank 56. When the piston 64 has moved substantially half of its stroke the piston rod stop 66 will have entered the hole in plate 68 and the follower 70 will bear thereagainst. Substantially at this time the stop 67 will have entered the hole in plate 69 and picked up its follower plate 70. Further movement of the piston 64 to the left will cause compression of spring 71 until such time as the piston 64 passes the ports 74 and exhausts, this exhaust actuating the piston 105 to move the slide valve to the right and bring port 99 into register with passage 102, while at the same time cutting off supply of fluid to passage 101 of the exhausted cylinder. Admission of fluid through passage 102 to the space between piston 65 and divider 73 will cause the piston and rod to move to the right until it reaches the position shown in Fig. 4. It will thus be seen that due to the admission of fluid under pressure coupled with the stored energy of spring 71 a hammer blow will be delivered at each point of reversal of the stroke. Following the hammer blow the energy transmitted to the lever and dummy coupler will progressively decrease as the spring 71 expands and then is compressed in a direction resisting the movement caused by the motive fluid behind the piston. In other words, the hopper car which is connected to the dummy coupler will have been moving slowly to the right just prior to the parts assuming their full line position of Fig. 4. It is then delivered a heavy hammer blow to the left followed by a progressive slowing up in its movement toward the left, at the end of which a hammer blow to the right will be delivered. It will be seen that the lading in the car, since it moves with the car, will likewise be given the same motion and this motion is such as will tend to bounce the particles of lading off of the slope sheets D and drive or bump them toward the discharge outlets E. While the car has been referred to as moving to the right and left, it will be understood that this motion will be relatively slight and may be wholly within the clearances existing between the truck parts so that the wheels W may not move on the rails R. In some cases it may be found advantageous to change the leverage of lever 53 so that the wheels W will be rocked a small amount along the rails R.

Assuming the cars to be in the position shown in Fig. 1 the unloader car will be uncoupled from the empty car which will then be pushed to the left a slight amount, either manually or through use of the cylinders 84, after which the pistons 86 are retracted and the unloader car shifted so as to be coupled with the loaded car shown in Fig. 1. As soon as the unloader car is coupled to the loaded hopper car either the pushers 87 are used or the block of Figs. 8 and 9 is used to separate the horn 20 and striker 21, thus compressing the spring 8 and in effect locking out or immobilizing the draft gear relative to the hopper car to which the unloader is coupled. In some cases it may be desirable to accomplish a rigid lockout, in which case inserts may be placed in the slots 15 on either side of the draft keys 12 and this may be done without a compression of the springs 8. However, such an arrangement may prove harmful in older cars where excessive looseness has developed. Following the lockout of the hopper car draft gear the motive fluid will be admitted to the cylinder 63 so as to set up the succession of hammer blows oscillating the car and in effect dumping the material out of the hopper outlets. Due to the arrangement of the flanges of wheels 31 closely adjacent to the faces of rails T, as clearly shown in Fig. 3, the unloader car will be held firmly anchored against movement in the direction of power application, insuring effective transmission of oscillations through the locked-out or immobilized draft gear directly to the car being unloaded in a direction longitudinally thereof. The unloader car will thus be firmly anchored at points on the rails T where it may be selectively lined up with any of the rails R for coupling with a car or cars mounted thereon for unloading. As soon as the hopper car is emptied and moved away from the unloading car, this car may again be shifted back to the position shown in Fig. 1 and into position to unload a car which will have been in the meantime shifted into position over the hopper. Usually the shifting of the loaded and emptied hopper cars will be accomplished by a locomotive, but in cases of emergency the cars may be shifted by the unloader acting as a small locomotive running on rails R and driven by motor 44 after the wheels 37 have been lowered onto the rails R by motors or other means 43. It will thus be seen that an extremely flexible unloading system has been provided in which the cars to be unloaded are shaken longitudinally or in the direction of their greatest strength and by means of a device which tends to pump the material out of the hopper car. It will also be obvious that no permanent and expensive structure is required at the hopper, the only permanent part of the installation being the rails T and the crossings with rails R.

While the car unloader has been described more or less in detail with specific reference to certain modes of operation, it will be obvious to persons skilled in the art that various modes and sequence of operations may be followed and slight variations of equipment made without departing from the scope of the following claims defining my invention.

What is claimed is:
1. A vehicle unloader for clearing the lading from a bottom discharge vehicle having a body and a resiliently mounted coupler connected thereto comprising, an unloader car, a coupler carried by the unloader car and adapted to be coupled with the vehicle coupler, power means carried by said unloader car to shift the unloader car into and out of position to be coupled with the vehicle, power actuated means carried by the unloader car and engaging said vehicle to shift the latter away from said unloader car and relative to the coupled couplers, and means to oscillate said unloader car coupler and the vehicle coupled thereto.

2. A vehicle unloader for clearing the lading from a bottom discharge vehicle having a body and a resiliently mounted coupler connected thereto comprising, an unloader car, a coupler carried by the unloader car and adapted to be coupled with the vehicle coupler, means to shift the vehicle away from said unloader car and relative to the coupled couplers, and means to oscillate said couplers and the vehicle connected thereto.

3. A vehicle unloader for clearing the lading from a bottom discharge vehicle having a body and a resiliently mounted coupler connected thereto comprising, an unloader car, a coupler carried by the unloader car and adapted to be coupled with the vehicle coupler, fluid pressure means operable to shift the unloader car and vehicle longitudinally relative to each other when coupled together, and power means connected to said unloader car coupler and operable to longitudinally oscillate said coupled couplers and the shifted vehicle connected thereto.

4. In an apparatus for vibrating a hopper car body during its unloading operation, said car being mounted on wheeled trucks for longitudinal movement and having a coupler longitudinally movable relative to the car body, a power actuated oscillator, a coupler head connected to said oscillator and oscillated thereby and arranged for coupling association with said car coupler, and fluid power actuated means to longitudinally shift the car coupler relative to the body and to hold the same in shifted position during oscillation of the car body.

5. The substance of claim 4 characterized in that said fluid power means comprises in part a plurality of pistons slidable in a block and insertable between a coupler and car body part.

6. The structure of claim 1 characterized in that means are provided for securing the unloader car against movement in the direction of its length.

ROBERT A. SHIELDS.

References Cited in the file of this patent
UNITED STATES PATENTS

| Number | Name | Date |
|---|---|---|
| 1,593,303 | Hill | July 20, 1926 |
| 1,627,481 | Clapp | May 3, 1927 |
| 1,742,444 | Gruss | Jan. 7, 1930 |
| 1,814,732 | Nyborg et al. | July 14, 1931 |
| 2,142,360 | Ljungkull | Jan. 3, 1939 |
| 2,214,755 | Tafel | Sept. 17, 1940 |
| 2,284,226 | Oglesby | May 26, 1942 |

FOREIGN PATENTS

| Number | Country | Date |
|---|---|---|
| 128,094 | France | Dec. 23, 1878 |
| 470,098 | Germany | Jan. 5, 1929 |